(12) United States Patent
Carter et al.

(10) Patent No.: US 9,015,190 B2
(45) Date of Patent: Apr. 21, 2015

(54) GRAPHICALLY REPRESENTING AN INPUT QUERY

(75) Inventors: Sam Carter, Colma, CA (US); Mitur Sakoda, Chicago, IL (US); Brian DaRosa, Wells, ME (US)

(73) Assignee: Longsand Limited (GB)

( * ) Notice: Subject to any disclaimer, the term of this patent is extended or adjusted under 35 U.S.C. 154(b) by 221 days.

(21) Appl. No.: 13/537,744

(22) Filed: Jun. 29, 2012

(65) Prior Publication Data

US 2014/0006446 A1 Jan. 2, 2014

(51) Int. Cl.
*G06F 17/30* (2006.01)

(52) U.S. Cl.
CPC ................................ *G06F 17/30277* (2013.01)

(58) Field of Classification Search
CPC .................................................. G06F 17/30277
USPC .......................................... 707/705, 769, 798
See application file for complete search history.

(56) References Cited

U.S. PATENT DOCUMENTS

| | | | | |
|---|---|---|---|---|
| 5,418,950 | A * | 5/1995 | Li et al. .......................... | 715/781 |
| 6,326,962 | B1 * | 12/2001 | Szabo ............................ | 715/762 |
| 6,353,830 | B1 | 3/2002 | Yee et al. | |
| 7,603,347 | B2 * | 10/2009 | Thusoo et al. .......................... | 1/1 |
| 8,375,014 | B1 * | 2/2013 | Brocato et al. ................. | 707/705 |
| 2003/0120682 | A1 * | 6/2003 | Bestgen et al. ............ | 707/104.1 |
| 2004/0103090 | A1 | 5/2004 | Dogl et al. | |
| 2004/0205082 | A1 * | 10/2004 | Fontoura et al. ............... | 707/101 |
| 2005/0004911 | A1 * | 1/2005 | Goldberg et al. .................. | 707/7 |
| 2005/0108200 | A1 | 5/2005 | Meik et al. | |
| 2006/0116999 | A1 * | 6/2006 | Dettinger et al. ................. | 707/4 |
| 2009/0144262 | A1 | 6/2009 | White et al. | |
| 2009/0150906 | A1 * | 6/2009 | Schmidt et al. ............... | 719/317 |
| 2009/0228481 | A1 * | 9/2009 | Neale et al. ........................ | 707/5 |
| 2010/0005077 | A1 * | 1/2010 | Krishnamurthy et al. ........ | 707/4 |
| 2010/0268703 | A1 * | 10/2010 | Buck ............................. | 707/713 |
| 2011/0093471 | A1 * | 4/2011 | Brockway et al. ............ | 707/747 |
| 2011/0184984 | A1 * | 7/2011 | Getner ......................... | 707/779 |
| 2011/0202555 | A1 * | 8/2011 | Cordover et al. ............ | 707/769 |
| 2012/0310951 | A1 * | 12/2012 | Kumar et al. ................. | 707/749 |

OTHER PUBLICATIONS

Fritchey, G., "Examining Query Execution Plans"; 2012; SQLSeryerPedia; 5 pages.

* cited by examiner

*Primary Examiner* — Leslie Wong
(74) *Attorney, Agent, or Firm* — Hewlett-Packard Patent Department

(57) ABSTRACT

Techniques for graphically representing an input query are described in various implementations. In one example implementation, a method that implements the techniques may include receiving, in an electronic discovery computing system and from a user interface, an input query that includes a Boolean expression for identifying documents in a document repository of the electronic discovery computing system. The method may also include parsing the input query to identify terms and operators included in the input query, and generating a graphical representation of the input query that shows how the terms and operators are interpreted by the electronic discovery computing system. The method may also include causing the graphical representation to be displayed via the user interface.

14 Claims, 4 Drawing Sheets

GRAPHICALLY REPRESENTING AN INPUT QUERY

BACKGROUND

Electronic discovery refers to the discovery of electronically stored information (ESI) in the context of litigation. ESI may include many different types of electronic data, such as documents, emails, chat and/or other electronic messages, audio and/or video files, databases, web sites, and any other electronic information that might be relevant in a particular lawsuit. In the United States, electronic discovery in federal litigation is governed by the Federal Rules of Civil Procedure (FRCP). Companies or law firms that fail to comply with the FRCP during discovery may be fined or sanctioned, and in some cases may face even more serious consequences.

DETAILED DESCRIPTION

The volume of potentially relevant ESI in many cases can be enormous, and the costs associated with electronic discovery may increase significantly as the volume of potentially relevant ESI increases. To limit the costs associated with electronic discovery, attorneys may build complex queries in an effort to precisely identify electronic documents that may be relevant to a particular issue. These complex queries are often crafted using text strings that include arbitrarily complex Boolean expressions. Such queries are prone to human error, and even relatively minor mistakes during entry (e.g., the improper placement of a single character) can lead to serious unintended consequences.

In some cases, a mistake in entering a query may result in the query being malformed (e.g., a query that includes a syntactical error). Such mistakes may often be relatively easy to diagnose because the system may return an error message to the user, and may even identify the cause or at least the likely cause of the error.

In other cases, a mistake in entering the query may result in a valid, well-formed query, but one that the user did not intend. These types of mistakes are often much more difficult to identify because the system does not return an error message to the user, and instead returns results that are responsive to the incorrect query that was entered. In such cases, the user is presented with results that are responsive to a valid query, albeit one that is different than the user intended, and the user may therefore believe that the query was entered correctly.

In accordance with the techniques described here, a user interface of an electronic discovery system may provide a graphical representation of a query as it is entered so that the user can determine whether the query is being interpreted by the electronic discovery system in a manner that is consistent with the user's intention. In sonic cases, such a graphical representation may provide a relatively simple overview of the entered query, which may be easier for a user to analyze and troubleshoot than a text string that includes an arbitrarily complex set of Boolean expressions. The provision of a graphical representation of the query may reduce the chances for errors, and may also reduce the costs associated with electronic discovery. Also, in some implementations, the graphical representation may be used as a discovery tool to summarize for others (e.g., a supervising attorney, a judge, a regulatory body, or an opposing party) what types of documents would be captured by a particular query. These and other possible benefits and advantages will be apparent from the figures and from the description that follows.

Figure 1:
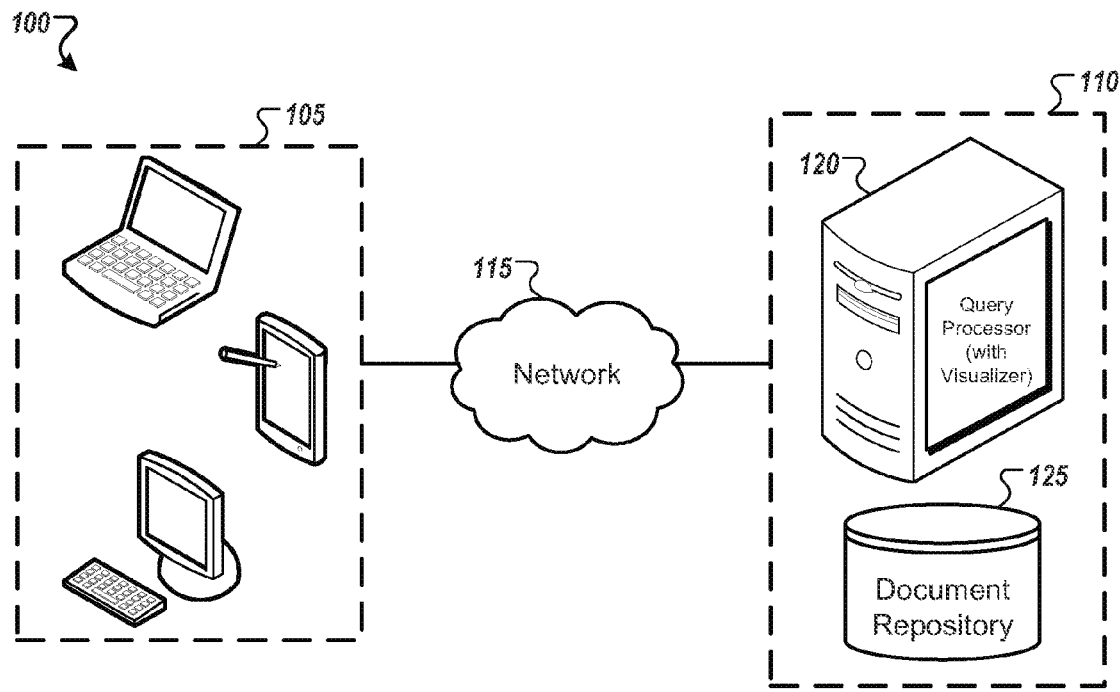
FIG. 1 is a conceptual diagram of an example electronic discovery environment.

FIG. 1 is a conceptual diagram of an example electronic discovery environment 100. Environment 100 includes one or more computing devices 105 in communication with an electronic discovery system 110 via a network 115. Network 115 may be implemented in any appropriate manner, including a local area network (LAN), a wide area network (WAN), the Internet, or another appropriate type of computer network or combination of computer networks. While shown as a client-server type of architecture, it should be appreciated that other appropriate configurations of the various components are also within the scope of this disclosure. For example, the electronic discovery system 110 may be configured to execute locally on any of the one or more computing devices 105 rather than being accessed through the network 115.

In the example environment 100, one or more computing devices 105 may provide respective user interfaces that allow a user, such as an attorney or other legal professional, to enter queries to identify documents that are loaded into the electronic discovery system 110. For example, the user may enter a query including a specific term that is relevant to a particular issue in a case, and may receive a list of resulting documents from the electronic discovery system 110 that include that specific term. In this relatively simple example, the query may also be relatively simple. But in many cases, the user may wish to enter more complex queries in an effort to identify all or a large portion of relevant documents, while at the same time excluding all or a large portion of non-relevant documents. Such complex queries may be constructed using multiple keywords or terms connected by Boolean operators, and may quickly become difficult for a human user to easily understand in text form. For example, in some cases the queries may include tens, hundreds, or even thousands of terms.

While the examples provided herein generally describe queries with terms being connected by Boolean operators (e.g., AND, OR, or NOT), it should be understood that other appropriate input queries and/or syntaxes are also possible. For example, certain electronic discovery systems may be configured to provide proximity searching (e.g., "constructive NEAR notice"), as well as other appropriate searching protocols, including but not limited to fuzzy searching, conceptual searching, or Soundex searching.

The electronic discovery system 110 may include a number of components, including a query processor 120 and a document repository 125. When an input query is received at the electronic discovery system 110, the query processor 120 may parse the input query to identify terms and operators included in the query, and to interpret the query according to a set of parsing rules that are defined for a particular implementation. For example, certain electronic discovery systems may interpret well-formed but inherently ambiguous queries in one manner, while other systems (e.g., other electronic discovery systems or other legal software packages that use different syntaxes for searching) may interpret the same queries in a different manner. Regardless of the particular interpretive approach taken, the query processor 120 may interpret the query in the manner that is consistent with the particular implementation, and may generate a graphical representation of the query that shows how the terms and operators are being interpreted by the system. This graphical representation may then be provided for display via a user interface on the computing device that entered the query.

In this manner, the user is provided with a visual tool that allows for verification that the entered query is being interpreted in the manner that the user intended. If the graphical representation shows that the query is not being interpreted as intended, the user may edit the query until the graphical representation matches the user's intention. If the graphical representation matches the user's expectations for how the query is intended to be interpreted, the user can be confident that the query does not include typographical or other mistakes. Once the user is satisfied that the query is being interpreted as intended (e.g., when the graphical representation matches the user's intention for the query), the user may request execution of the query to retrieve a list of resulting documents from the document repository 125.

The query processor 120 may be hosted on, or otherwise implemented by, any appropriate type of computing device, such as a device that includes a processing unit, a system memory, and a system bus that couples the processing unit to the various components of the computing device. The processing unit may include one or more processors, each of which may be in the form of any one of various commercially available processors. Generally, the processors may receive instructions and data from a read-only memory and/or a random access memory. The computing device may also include a hard drive, a floppy drive, and/or a CD-ROM drive that are connected to the system bus by respective interfaces. The hard drive, floppy drive, and/or CD-ROM drive may access respective non-transitory computer-readable media that provide non-volatile or persistent storage for data, data structures, and computer-executable instructions to perform portions of the functionality described here. Other computer-readable storage devices (e.g., magnetic tape drives, flash memory devices, digital versatile disks, or the like) may also be used with the computing device.

Figure 2:
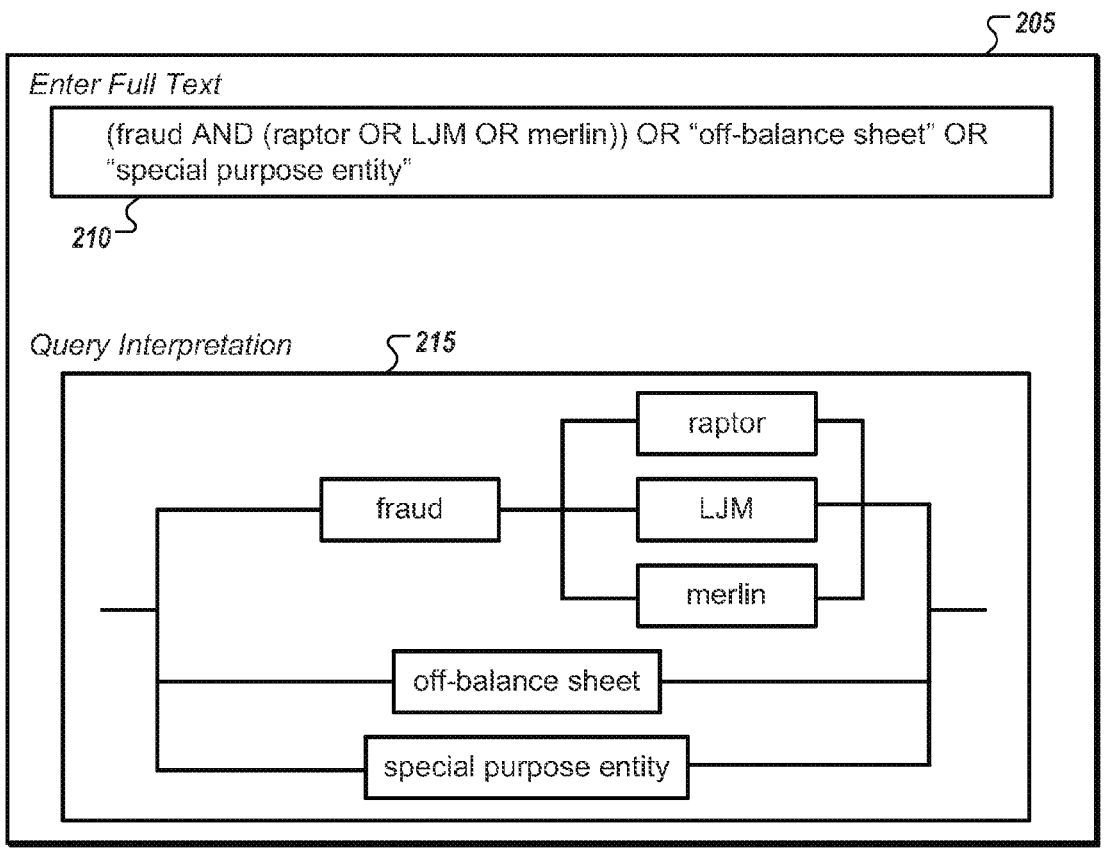
FIGS. 2-4 are block diagrams of example user interfaces provided within an electronic discovery system.

FIG. 2 is a block diagram of an example user interface 205 provided within an electronic discovery system, such as the electronic discovery system 110 of FIG. 1. User interface 205 includes a query entry section 210 and a query visualization section 215. For purposes of illustration, these sections are shown in two areas of the same screen, but it should be understood that the sections may also be displayed in a different manner, such as on different tabs of a browser, or in any other appropriate manner. In some implementations, query entry section 210 may include a text box control that provides for textual input of a query, but other implementations are also possible within the scope of this disclosure, including for example voice based input.

In the illustrated query entry section 210, the user has entered the query "(fraud AND (raptor OR LJM OR merlin)) OR 'off-balance sheet' OR 'special purpose entity'". This example query includes terms that have been published by the Electronic Discovery Reference Model (EDRM) organization as part of a data set that includes email messages and attachments that were made public as part of the Enron litigation. The example input query is being interpreted by the electronic discovery system as shown in the graphical representation of the query displayed in the query visualization section 215, where the Boolean AND operator is shown using serial paths through the diagram and the Boolean OR operator is shown using parallel paths through the diagram. For example, the top path of the graphical representation of the input query shows that documents having the term "fraud" in combination with any of the terms "raptor" or "LJM" or "merlin" will be included in the result set. Similarly, if either of the terms "off-balance sheet" or "special purpose entity" is included in the document, then the document will be included in the result set, regardless of whether the other terms are present. As illustrated in the graphical representation, the user may trace any single line from the input to the output to determine which terms or combinations of terms found in a document will result in the document being returned by the query.

Figure 3A:
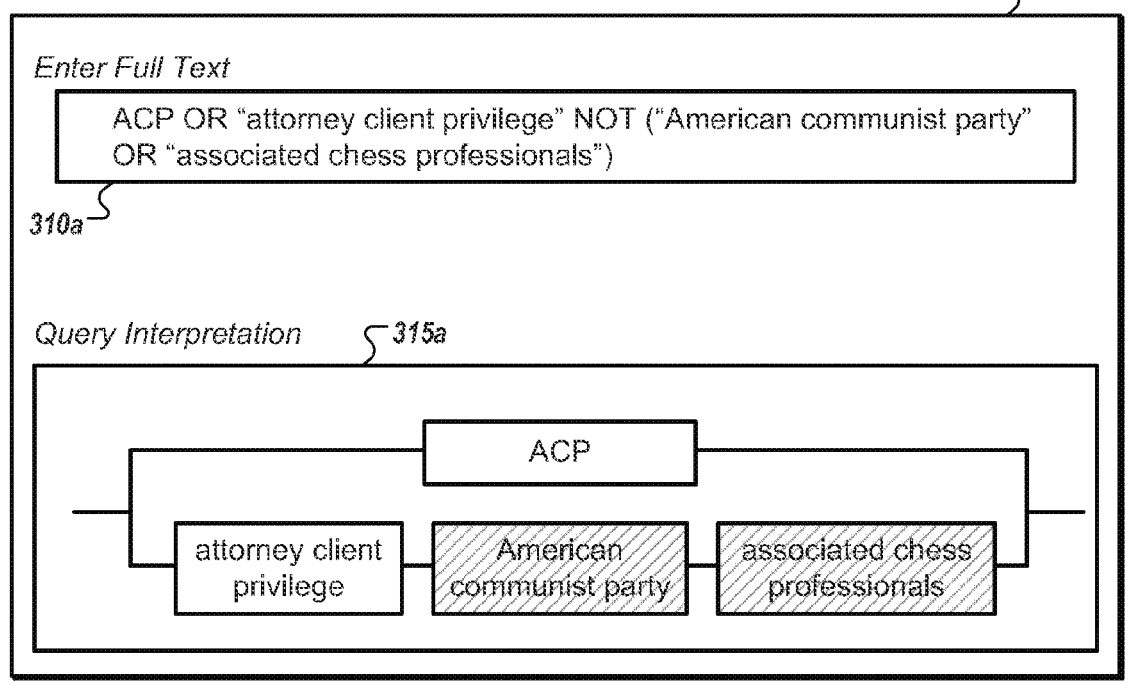
Figure 3B:
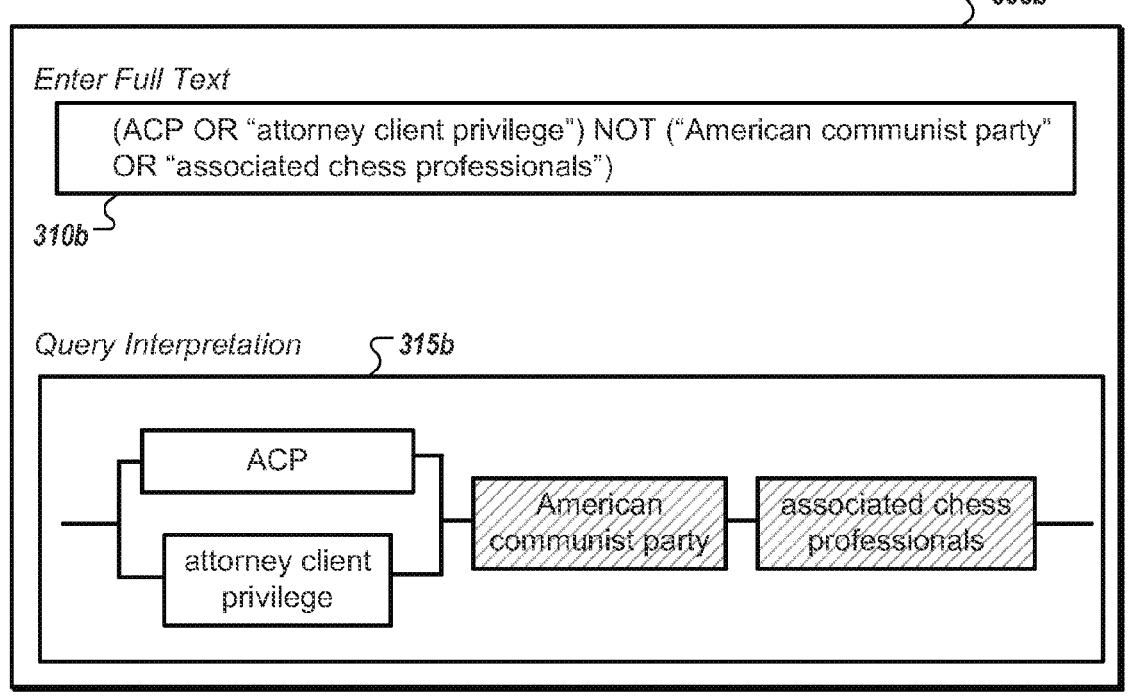

FIGS. 3A and 3B are block diagrams of example user interfaces 305a and 305b provided within an electronic discovery system, such as the electronic discovery system 110 of FIG. 1. These two diagrams illustrate how relatively minor differences in an input query can dramatically affect the scope of the query. In the examples shown, the user intends to capture privileged documents (e.g., to include on a privilege log rather than producing). The user is aware that privileged documents will often include the term "attorney client privileged" or a common abbreviation for the term—"ACP". However, the user is also aware that the abbreviation "ACP" is also used for the terms "American communist party" and "associated chess professionals", in which case the ACP abbreviation would not necessarily indicate a privileged document. As such, in the examples shown, the user intends to identify all documents that contain the terms "ACP" or "attorney client privilege" hut not documents that also contain either of the terms "American communist party" or "associated chess professionals". FIG. 3A demonstrates how a simple error in inputting the query can lead to unintended results, while FIG. 3B demonstrates a corrected query that aligns with the user's intentions for the query.

FIG. 3A shows a query entered in the query entry section 310a that is missing parentheses around the expression "ACP OR 'attorney client privilege'", which results in a graphical representation in the query visualization section 315a. The graphical representation shows the user that the input query is inconsistent with the intent of the query, showing (in the top path) that all documents including the term "ACP" will be included in the result set (e.g., regardless of whether the documents also include the terms "American communist party" and/or "associated chess professionals"). The graphical representation also shows (in the bottom path) that documents that include the term "attorney client privilege" will only be included in the result set if the documents do not contain the terms "American communist party" and "associated chess professionals".

As illustrated here, the terms that are excluded as part of a NOT expression (e.g., "NOT ('American communist party' OR 'associated chess professionals')") are shown in cross-hatched boxes to indicate that the NOT expression will return a value of true only if the terms are not contained in the documents. In some implementations, the NOT indication may be represented using different graphical indicators, such as by using different colors for terms that are present versus those that are excluded. For example, terms that are part of a NOT expression may be represented by the color red, while terms that are part of a normal inclusionary operator may be represented by the color green.

Upon recognizing that the graphical representation does not align with the user's intent for the query, the user may edit the query as shown in user interface 305b of FIG. 3B, e.g., by including an additional set of parentheses in the input query entered in the query entry section 310b. The resulting graphical representation in query visualization section 315b shows the user that the edited query will be interpreted by the electronic discovery system in a manner that is consistent with the user's intentions.

Figure 4:
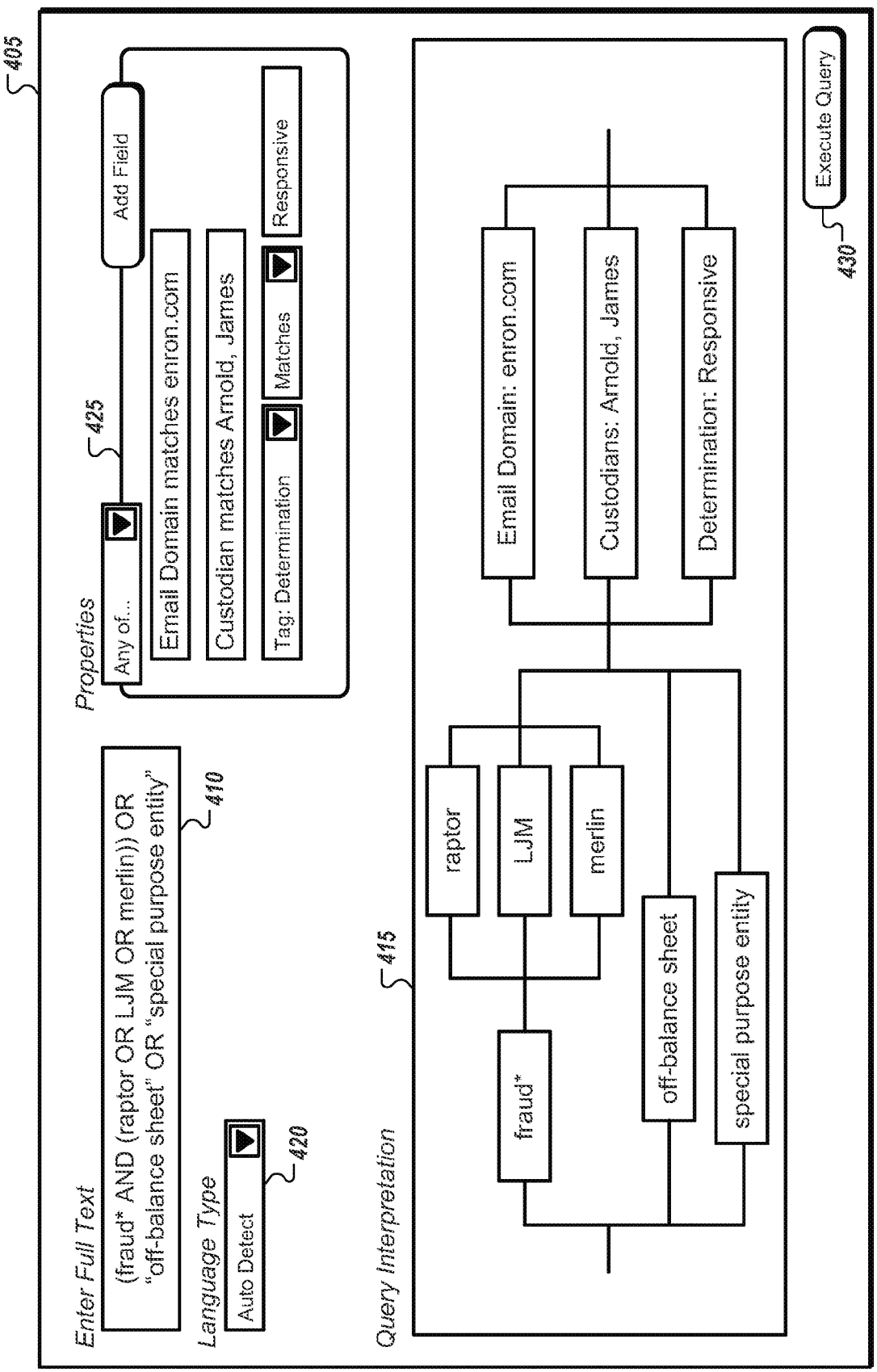

FIG. 4 is a block diagram of an example user interface 405 provided within an electronic discovery system, such as the electronic discovery system 110 of FIG. 1. User interface 405 includes a query entry section 410, a query visualization section 415, a language selector 420, a metadata entry section 425, and a button 430 for executing the query. For purposes of illustration, the various sections and controls are shown in different areas of the same screen, but it should be understood that the sections and controls may also be displayed in a different manner, such as on different tabs of a browser, or in any other appropriate manner.

In the illustrated query entry section 410, the user has entered the query "(fraud* AND (raptor OR UM OR merlin)) OR 'off-balance sheet' OR 'special purpose entity'". In this query, the "*" character represents a wildcard that means the term "fraud*" should be expanded to include any terms that begin with "fraud", including for example "fraud" itself as well as "fraudulent". As shown in the graphical representation, the wildcard term is shown using the visual indicator of the "*" character to indicate to the user that additional words may also be included in the query. In some implementations, the visual indication may include an actuation mechanism, such that when the actuation mechanism is actuated, the graphical representation is modified to show how the term with a wildcard is being interpreted. For example, in the case of the visual indication being a "*" character, the "*" character may be selectable (e.g., upon a mouse click), and in response to the selection, the representation of the term may expand to show some or all of the different ways that the term is being interpreted. As an example, the term "fraud*" may be expanded to show the terms "fraud" OR "fraudulent".

in some implementations of the electronic discovery system, the query processor may provide word stemming functionality such that input terms are interpreted to include other forms of a particular term, such as singular and plural versions of nouns, different conjugations of verbs, or the like. In such implementations, the graphical representation of the input query may include a visual indication that identifies the stemmed term. For example, the stemmed term may be shown with a "+" character that indicates to the user that additional words will also be included in the query. In some implementations, the visual indication may include an actuation mechanism, such that when the actuation mechanism is actuated, the graphical representation is modified to show how the stemmed term is being interpreted. For example, in the case of the visual indication being a "+" character, the "+" character may be selectable (e.g., upon a mouse click), and in response to the selection, the representation of the stemmed term may expand to show some or all of the different ways that the term is being interpreted. As an example, the term "litigator" may include a "+" character, which may expand the term "litigator+" to "litigator" OR "litigators" OR "litigation" OR "litigations" OR "litigate" OR "litigating".

In some implementations, the language selector 420 may be used to specify the language rules for how the stemming and/or wildcard functionality is implemented in the system. For example, if the language selector 420 is used to select an English rule set, than the terms will be expanded or stemmed according to English language words. In this example, the terms may be interpreted (e.g., expanded or stemmed) in a different manner than if a French rule set is selected.

In addition to the stemming and wildcard functionality described above, the electronic discovery system may also include rules for interpreting other possible sources of ambiguity that may be included in an input query. Such sources of ambiguity may include, for example, capitalization (e.g., "Windows" versus "windows" or "CAT" versus "cat", although words may also be commonly capitalized based on word placement, such as at the beginning of a sentence); stop words (e.g., common words such as "a", "an", "that", and/or "the", which may be excluded from an index and therefore not be searchable); tokenization (e.g., whether "over-eager" should be treated as one or two words); whitespace (e.g., how a user can search for "York University" without finding documents related to "New York University"); accents/diacritics (e.g., the Spanish word peña means "cliff" while pena means sorrow); and/or dialects or other regional linguistic differences (e.g., "color" versus "colour"; "Beijing" versus "Peking"; "strasse" versus "straβe"; or simplified versus traditional Chinese). In these or other cases where a user has provided an input query that is potentially ambiguous, the electronic discovery system may provide a graphical representation of the input query according to how the input query is being interpreted by the system, thus allowing the user to determine whether the input query is being interpreted in the intended manner.

The metadata entry section 425 may include a number of controls that allow the user to specify metadata filters that limit the scope of the query to documents having certain associated metadata. The metadata filters may be applied in any appropriate manner, including in a user-selectable manner as is shown by the drop-down box as illustrated. In the drop-down box, the user may be able to select, for example, "Any of . . . " or "All of . . . " to control how the filters are applied. In this case, the user has selected an "Any of . . . " filter, which may combine the metadata filters into an OR expression, while if the user had selected an "All of . . . " filter, the metadata filters would be applied using an AND expression. The metadata filters may be implemented to allow users to filter on different fields of metadata associated with documents in the repository, including for example an email domain, a custodian or owner of the document, or a particular tag that has been applied to the document. In the illustrated example, the user has set up metadata filters of "Email Domain matches enron.com", "Custodian matches Arnold, James", and "Tag: Determination matches Responsive". In some implementations, certain of the metadata may be fixed (e.g., objective metadata such as a file extension associated with a particular file or an email domain), and certain of the metadata may be modifiable (e.g., user work-product metadata such as a user-applied tag) during the course of discovery.

The input metadata filters may be interpreted by the query processor in association with the textual Boolean expression entered by the user to form the input query. Using this combined approach, the user may specify data that is contained in the document itself, as well as specifying metadata that is associated with the document, but that may not appear in the contents of the document. The query processor may then generate the graphical representation of the input query, including a graphical representation of the terms and operators included in the input string as well as the metadata filters applied to the query, as is shown in query visualization section 415.

In some implementations, the graphical representation may be generated and displayed to the user as the input query is entered into the user interface. For example, as each portion of the input query is entered, the corresponding portion of the graphical representation may be generated and displayed. This may allow the user to verify in near real-time whether the query is being interpreted as intended, and to make adjustments as necessary. When the user is satisfied that the input query is complete and is being interpreted as intended, the user may provide an execution command via the user interface, e.g., by clicking button 430, to execute the query.

Figure 5:
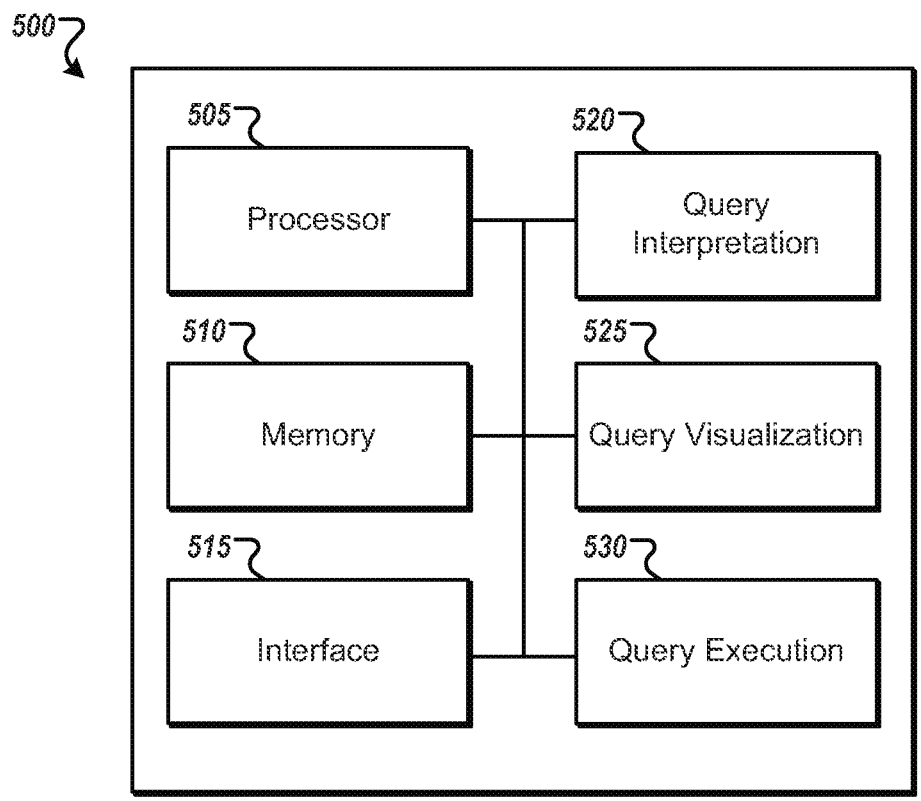
FIG. 5 is a block diagram of an example computing system for graphically. representing an input query.

FIG. 5 is a block diagram of an example computing system 500 for graphically representing an input query. Computing system 500 may, in some implementations, be used to perform portions or all of the functionality described above with respect to the electronic discovery system 110 of FIG. 1.

As shown, the example computing system 500 may include a processor 505, a memory 510, an interface 515, a query interpretation engine 520, a query visualization engine 525, and a query execution engine 530. It should be understood that the components shown here are for illustrative purposes, and that in some cases, the functionality being described with respect to a particular component may be performed by one or more different or additional components. Similarly, it should be understood that portions or all of the functionality may be combined into fewer components than are shown.

Processor 505 may be configured to process instructions for execution by the computing system 500. The instructions may be stored on a non-transitory tangible computer-readable storage medium, such as in memory 510 or on a separate storage device (not shown), or on any other type of volatile or non-volatile memory that stores instructions to cause a programmable processor to perform the techniques described herein. Alternatively or additionally, computing system 500 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

Interface 515 may be implemented in hardware and/or software, and may be configured, for example, to receive and respond to input queries for identifying documents in an electronic discovery document repository. The input queries may be provided to interface 515, e.g., via a user interface of a remote computing device.

Query interpretation engine 520 may execute on processor 505, and may be configured to identify terms and operators in the input query. Query interpretation engine 520 may also be configured to generate a query interpretation that defines how the terms and operators of the input query are to be executed against the electronic discovery document repository. In some implementations, the query interpretation for a given input query may be dependent upon a number of implementation-specific factors, which may be defined using a set of query interpretation rules.

Query visualization engine 525 may execute on processor 505, and may be configured to generate a graphical representation of the generated query interpretation. Query visualization engine 525 may also cause the graphical representation to be displayed via the user interlace of the device that provided the input query. For example, the graphical representation may be transmitted to a remote computing device via interface 515 using one or more appropriate commands.

Query execution engine 530 may executed on processor 505, and may be configured to execute the input query in accordance with the generated query interpretation in response to receiving an execution command from the user via the user interface. For example, a user may click on an "Execute Query" button or other similar control to indicate that the user is satisfied with the input query.

Figure 6:
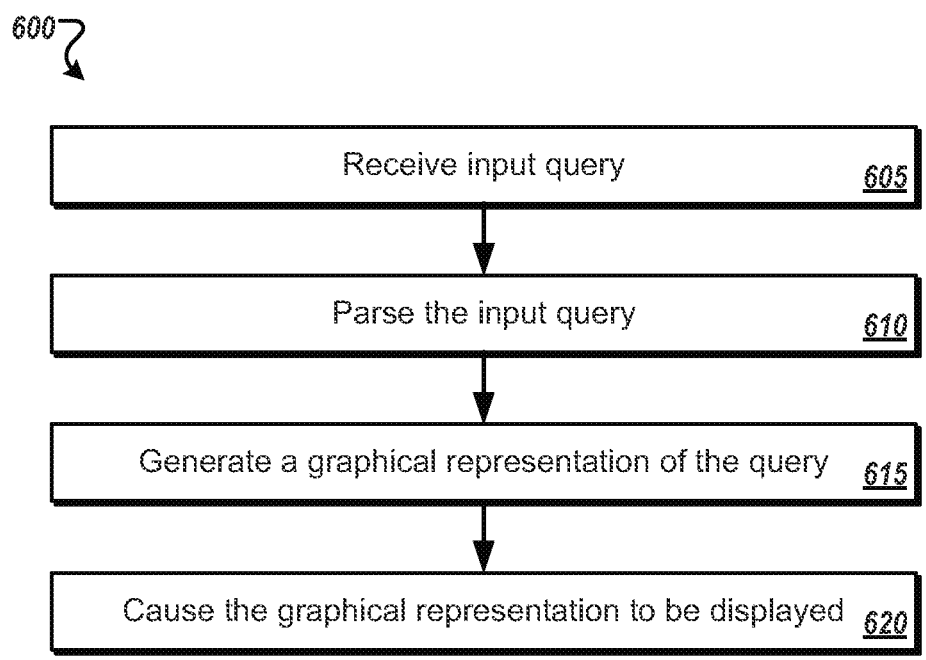
FIG. 6 is a flow diagram of an example process for graphically representing an input query.

FIG. 6 is a flow diagram of an example process 600 for graphically representing an input query. The process 600 may be performed, for example, by an electronic discovery system such as the system 110 illustrated in FIG. 1. For clarity of presentation, the description that follows uses the electronic discovery system illustrated in FIG. 1 as the basis of an example for describing the process. However, another system, or combination of systems, may be used to perform the process or various portions of the process.

Process 600 begins at block 605, in which an electronic discovery computing system receives an input query from a user interface. The input query may include one or more Boolean expressions for identifying documents in a document repository of the electronic discovery computing system. The input query may also include metadata associated with documents in the document repository.

At block 610, the electronic discovery computing system parses the input query to identify terms and operators included in the input query. In some implementations, the terms of the input query may include wildcards that indicate possible expansion of the term in a manner consistent with the query processor.

In some implementations, the query processor may provide word stemming functionality such that input terms are interpreted to include other forms of a particular term, such as singular and plural versions of nouns, different conjugations of terms, or the like.

At block 615, the electronic discovery computing system generates a visual representation of the input query. The graphical representation of the input query shows, in a graphical manner, how the terms and operators are being interpreted by the electronic discovery computing system. For example, in some implementations terms connected by a Boolean AND operator are shown using serial paths, and terms connected by a Boolean OR operator are shown using parallel paths. In cases where one or more metadata values are included in the input query, the graphical representation may also show how the metadata values are being interpreted by the system.

At block 620, the electronic discovery computing system causes the graphical representation to be displayed via the user interface. Upon viewing the graphical representation of the input query, the user may choose to either modify or execute the input query.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A method for graphically representing an input query, the method performed by one or more processors of an electronic discovery computing system and comprising:
   providing a user interface to enable execution of input queries to search for relevant documents in a document repository of the electronic discovery computing system;
   receiving an input query from a first portion of the user interface, the input query including a number of terms and operators that, when executed via a selectable feature on the user interface, cause the electronic discovery computing system to perform a search in the document repository based on the input query; and
   while receiving the input query, generating a graphical representation of the input query to be displayed on a second portion of the user interface in real-time, the graphical representation showing how the terms and operators are to be interpreted by the electronic discovery computing system upon execution of the search;
wherein generating the graphical representation includes generating a distinct visual indicator for each term operated by a Boolean NOT operator of the input query.

2. The method of claim 1, further comprising:
receiving, via a third portion of the user interface, nnetadata values associated with filters to be applied, by the electronic discovery computing system, in conjunction with execution of the terms and operators of the input query during the search.

3. The method of claim 2, wherein the electronic discovery computing system generates the graphical representation of the input query to show how the nnetadata values are to be interpreted by the electronic discovery computing system in real-time.

4. The method of claim 2, wherein the user interface enables a user to edit the input query, using the first portion and the third portion, until the graphical representation matches an intended search query by the user, the method further comprising:
in response to receiving a user selection of the selectable feature of the user interface, executing the search in the document repository based on the input query.

5. The method of claim 1, wherein generating the graphical representation in real-time includes (i) generating a serial path for each Boolean AND operator of the input query, and (ii) generating a parallel path for each Boolean OR operator of the input query.

6. The method of claim 1, wherein the input query includes a number of stemmed terms, and wherein generating the graphical representation includes generating a visual indication identifying each of the stemmed terms.

7. The method of claim 6, wherein the visual indication identifying each of the stemmed terms comprises an actuation mechanism, wherein upon a user selection of the actuation mechanism, the electronic discovery computing system modifies the graphical representation to show how the stemmed term is to be interpreted by the electronic discovery computing system upon execution of the search.

8. The method of claim 1, wherein the input query includes an indicator proximate to a wildcard term, and wherein generating the graphical representation includes generating a visual indication identifying the wildcard term.

9. The method of claim 8, wherein the visual indication identifying the wildcard term comprises an actuation mechanism, wherein upon a user selection of the actuation mechanism, the electronic discovery computing system modifies the graphical representation to show how the wildcard term is to be interpreted upon execution of the search.

10. An electronic discovery computing system comprising:
one or more processors; and
one or more memory resources storing instructions that, when executed by the one or more processors, cause the electronic discovery computing system to perform operations comprising:
providing a user interface to enable execution of input queries to search for relevant documents in a document repository of the electronic discovery computing system;
receiving an input query from a first portion of the user interface, the input query including a number of terms and operators that, when executed via a selectable feature on the user interface, cause the electronic discovery computing system to perform a search in the document repository based on the input query; and
while receiving the input query, generating a graphical representation of the input query to be displayed on a second portion of the user interface in real-time, the graphical representation showing how the terms and operators are to be interpreted by the electronic discovery computing system upon execution of the search;
wherein generating the graphical representation includes generating a distinct visual indicator for each term operated by a Boolean NOT operator of the input query.

11. The electronic discovery computing system of claim 10, wherein the user interface enables a user to edit the input query until the graphical representation matches an intended search query by the user, and wherein the instructions, when executed by the one or more processors, cause the electronic discovery computing system to perform further operations comprising:
in response to receiving a user selection of the selectable feature of the user interface, executing the search in the document repository based on the input query.

12. The electronic discovery computing system of claim 10, wherein the instructions, when executed by the one or more processors, cause the electronic discovery computing system to perform further operations comprising:
receiving, via a third portion of the user interface, metadata values associated with filters to be applied, by the electronic discovery computing system, in conjunction with execution of the terms and operators of the input query during the search.

13. The electronic discovery computing system of claim 12, wherein the executed instructions cause the electronic discovery computing system to generate the graphical representation of the input query to show how the metadata values are to be interpreted by the electronic discovery computing system in real-time.

14. A non-transitory computer-readable storage medium storing instructions that, when executed by a processor of an electronic discovery computing system, cause the electronic discovery computing system to:
provide a user interface to enable execution of input queries to search for relevant documents in a document repository of the electronic discovery computing system;
receive an input query from a first portion of the user interface, the input query including a number of terms and operators that, when executed via a selectable feature of the user interface, cause the electronic discovery computing system to perform a search in the document repository based on the input query; and
while receiving the input query, generate a graphical representation of the input query to be displayed on a second portion of the user interface in real-time, the graphical representation showing how the terms and operators are to be interpreted by the electronic discovery computing system upon execution of the search;
wherein generating the graphical representation includes generating a distinct visual indicator for each term operated by a Boolean NOT operator of the input query.

* * * * *